UNITED STATES PATENT OFFICE.

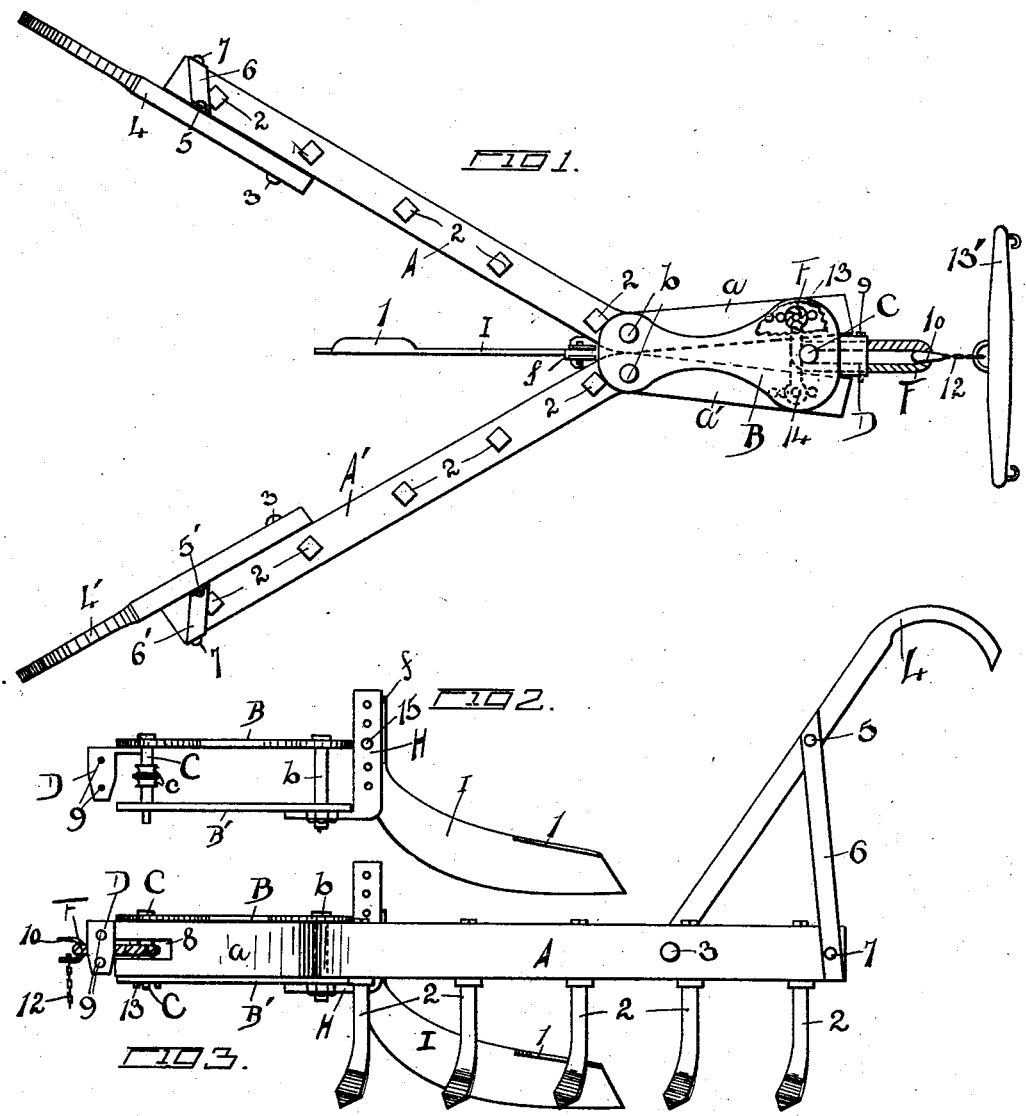

SETH SMITH, OF CASTANA, IOWA.

ONE-HORSE CULTIVATOR.

SPECIFICATION forming part of Letters Patent No. 715,888, dated December 16, 1902.

Application filed May 5, 1902. Serial No. 105,974. (No model.)

*To all whom it may concern:*

Be it known that I, SETH SMITH, residing at Castana, in the county of Monona and State of Iowa, have invented certain useful Improvements in One-Horse Cultivators; and I do hereby declare that the following is a full, clear, and exact description of the invention, such as will enable others skilled in the art to which it appertains to make and use the same, reference being had to the accompanying drawings, which form a part of this specification.

This invention relates to a new and novel improvement in one-horse cultivators.

The aim of my invention is to provide an articulated cultivator so constructed that the cultivator-beams, to which the cultivator-shovels are secured, are normally held by the operator, so that the shovels may be spread inward or outward.

The object of my invention is to provide a cultivator comprising a head, to which are articulated the cultivator-beams, which are held at the rear end by the operator, so that the cultivator-shovels are held under adjustment by the operator and may be carried inward or outward in such a manner that the cultivator-shovels may be carried against any weeds or vegetation to remove the same or be carried sidewise to escape an obstruction—as a stone or stump, for instance.

In the accompanying drawings I have shown in Figure 1 a top view of a cultivator embodying my invention. Fig. 2 shows a detail of the carrying-head, while Fig. 3 shows a side view of my invention.

In carrying out the aim of my invention I provide a carrying-head comprising the upper flat plate B, the lower counterpart plate B', which plates are connected in front by means of the vertical pin C and upon the rear by means of the two vertical pins b, as is shown in Figs. 1 and 2. This forward pin C is provided with the sheaves c, as is shown in Fig. 2. Depending from the forward end of the upper plate B are the ears D, provided with the horizontal pins 9, as shown. Extend upward from the lower rear portion of the lower plate B' is the holder H, suitably perforated to receive a pin 15, and this holder adjustably secures the trailing knife I, provided with a guard 1, extending laterally upon one or both sides to prevent this knife cutting too deep into the earth. This trailing knife is in the form of a support or runner and holds the carrying-head. To this lower plate B may further be secured a suitable shovel. Loosely articulated to the rear pins b are the two angular cultivator-beams A and A', the forward ends a of which are adapted to work into the carrying-head and are provided with suitable perforations in front, as is shown in Fig. 1, to receive the pins 13 and 14, to which are secured a suitable strand F, which strand works over the sheaves c, secured to the center pins C, being looped in front to receive a hook 10, by means of which the cultivator is dragged through the field. The trailing knife I is provided with the lateral extension f, which holds the knife in position, as disclosed in Fig. 2. To the rearward portion of these pivotally-held and articulated cultivator-beams A and A' are a plurality of suitable shovels 2, and at the rear, by means of the pins 3, are secured the handles 4 and 4', held by means of the braces 6 and 6', secured by the bolts 5 and 5' 7 and 7'.

A single draft-animal is secured to this cultivator by means of a singletree 13', secured to the hook 10 by means of the chain 12, so that the cultivator may be drawn through the field.

In using this cultivator should the operator encounter a weed upon either one side or the other he can swing the cultivator-beam upon that side inward or outward to engage and remove it. So, also, should a stump or a stone be encountered the beams may be laterally shifted to escape the same. Both the cultivator-beams may be carried toward one another or away from one another or be operated independently. In Fig. 1 they are shown distended their fullest capacity. When the draft-animal draws upon the strand F, the forward ends a and a' of the cultivator-beams are carried toward one another. To counteract this strain, the operator grasps the handles 4 4' and carries them toward one another a suitable distance, so that these cultivator-beams can always be thrown outward a sufficient distance within the furrow to properly cultivate the same.

If desired, a wheel could be secured to the trailing knife I, so that the cultivator be carried to or from the field as a wheelbarrow would, for instance.

The device is simple of construction and readily operated, and

Having thus described my said invention, what I claim as new, and desire to secure by United States Letters Patent, is—

1. The combination with a suitable head, of a pin vertically positioned within said head, two angular cultivator-beams pivoted near one end to aforesaid head, a strand passing from the forward end of one of said cultivator-beams and looping about aforesaid pin and being secured to the remaining cultivator-beam as set forth, a singletree secured to the loop of aforesaid strand, a plurality of cultivator-shovels secured to each of aforesaid cultivator-beams, and operating-handles extending from aforesaid cultivator-beams, all arranged as set forth.

2. A cultivator comprising a suitable head, cultivator-beams pivotally supported within said head, a strand secured to the forward ends of said beams, a trailing knife extending from said head, cultivator-shovels secured to said beams, and handles secured to said beams to actuate the same.

In testimony whereof I affix my signature in presence of two witnesses.

SETH SMITH.

Witnesses:
C. S. HANSEN,
E. E. WILEY.